United States Patent
Vaithianathan et al.

(10) Patent No.: US 10,860,232 B2
(45) Date of Patent: Dec. 8, 2020

(54) DYNAMIC ADJUSTMENT OF FINGERPRINTS ADDED TO A FINGERPRINT INDEX

(71) Applicant: HEWLETT PACKARD ENTERPRISE DEVELOPMENT LP, Houston, TX (US)

(72) Inventors: Srivenkatesh Kumar Vaithianathan, San Jose, CA (US); Sonam Mandal, Santa Clara, CA (US); Sudhanshu Goswami, Durham, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/361,367

(22) Filed: Mar. 22, 2019

(65) Prior Publication Data

US 2020/0301593 A1  Sep. 24, 2020

(51) Int. Cl.
*G06F 3/06* (2006.01)
*G06F 16/215* (2019.01)
*G06F 16/23* (2019.01)

(52) U.S. Cl.
CPC .......... *G06F 3/0641* (2013.01); *G06F 3/0608* (2013.01); *G06F 3/0673* (2013.01); *G06F 16/215* (2019.01); *G06F 16/2379* (2019.01)

(58) Field of Classification Search
CPC .... G06F 3/0641; G06F 3/0608; G06F 3/0673; G06F 16/2379; G06F 16/215
See application file for complete search history.

(56) References Cited

U.S. PATENT DOCUMENTS

| 8,037,345 | B1* | 10/2011 | Iyer | G06F 11/1004 714/6.12 |
| 8,311,964 | B1* | 11/2012 | Efstathopoulos | G06F 3/0608 706/45 |
| 8,392,384 | B1 | 3/2013 | Wu et al. | |
| 8,407,186 | B1* | 3/2013 | Cremelie | G06F 3/0641 707/664 |
| 9,235,475 | B1* | 1/2016 | Shilane | G06F 11/1453 |

(Continued)

OTHER PUBLICATIONS

Xie, F. et al., "Estimating Duplication by Content-based Sampling," USENIX Annual Technical Conference, 2013, pp. 181-186, https://www.usenix.org/system/files/conference/atc13/atc13-xie.pdf.

*Primary Examiner* — Ramon A. Mercado
(74) *Attorney, Agent, or Firm* — Hewlett Packard Enterprise Patent Department

(57) ABSTRACT

In some examples, a system dynamically adjusts a proportion of incoming data blocks for which respective fingerprints are added to a fingerprint index, where the fingerprint index correlates fingerprints for data blocks to storage location indicators for the data blocks. The system inputs, into a buffer, fingerprint index delta updates for the incoming data blocks according to the dynamically adjusted proportion, and updates the fingerprint index based on the fingerprint index delta updates input into the buffer. The system retrieves, in response to a fingerprint of an incoming data block, a collection of block entries from a block location index that stores information for data blocks in temporal order, and deduplicates the incoming data blocks using the collection of block entries from the block location index.

20 Claims, 6 Drawing Sheets

(56) References Cited

U.S. PATENT DOCUMENTS

| | | | |
|---|---|---|---|
| 9,298,723 B1* | 3/2016 | Vincent | G06F 16/1748 |
| 9,424,285 B1* | 8/2016 | Condict | G06F 3/0641 |
| 9,575,681 B1* | 2/2017 | Fisher | G06F 16/215 |
| 9,639,543 B2 | 5/2017 | Li et al. | |
| 9,940,060 B1* | 4/2018 | Colgrove | G06F 3/0641 |
| 9,977,746 B2 | 5/2018 | Muppalaneni et al. | |
| 10,169,365 B2 | 1/2019 | Maheshwari | |
| 10,175,894 B1* | 1/2019 | Visvanathan | G06F 3/0619 |
| 2008/0005141 A1 | 1/2008 | Zheng et al. | |
| 2010/0077168 A1* | 3/2010 | Arakawa | G06F 12/0223 |
| | | | 711/165 |
| 2010/0250858 A1* | 9/2010 | Cremelie | G06F 11/1453 |
| | | | 711/136 |
| 2012/0016882 A1* | 1/2012 | Tofano | G06F 7/00 |
| | | | 707/747 |
| 2012/0179883 A1* | 7/2012 | Ma | G06F 13/1647 |
| | | | 711/157 |
| 2013/0282672 A1* | 10/2013 | Tashiro | G06F 3/0608 |
| | | | 707/692 |
| 2017/0115883 A1* | 4/2017 | Muppalaneni | G06F 12/1009 |
| 2017/0212690 A1* | 7/2017 | Babu | G06F 3/0608 |
| 2017/0228177 A1* | 8/2017 | Kodama | G06F 3/0613 |
| 2018/0253255 A1* | 9/2018 | Jain | G06F 11/1453 |
| 2019/0034282 A1* | 1/2019 | Ugale | G06F 11/1441 |

\* cited by examiner

DYNAMIC ADJUSTMENT OF FINGERPRINTS ADDED TO A FINGERPRINT INDEX

BACKGROUND

Data reduction techniques can be applied to reduce the amount of data stored in a storage system. An example data reduction technique includes data deduplication. Data deduplication identifies data blocks that are duplicative, and seeks to reduce or eliminate the number of instances of duplicative data blocks that are stored in the storage system.

BRIEF DESCRIPTION OF THE DRAWINGS

Some implementations of the present disclosure are described with respect to the following figures.

Figure 1:
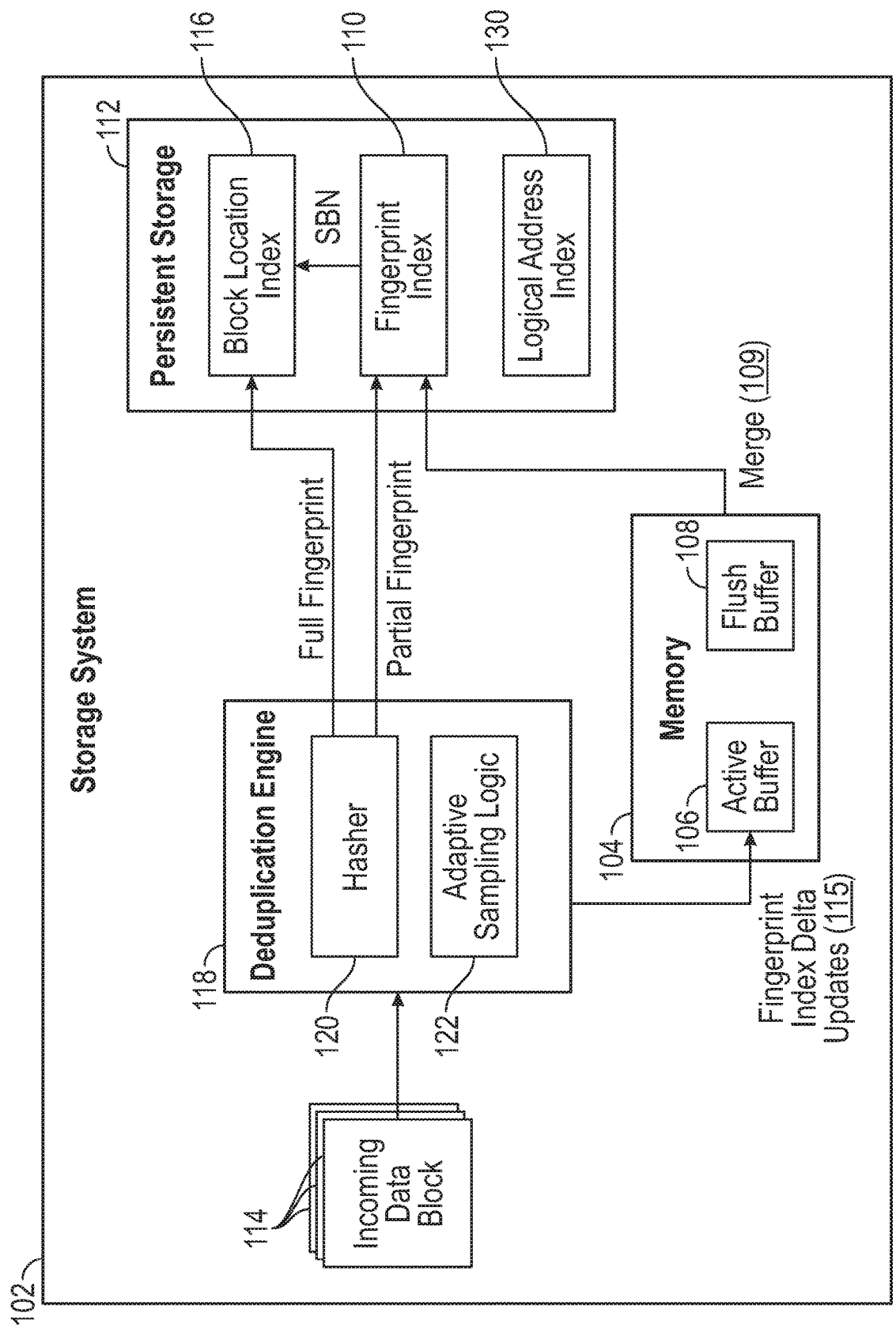
FIG. 1 is a block diagram of a storage system that includes an adaptive sampling logic according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, data deduplication is accomplished by computing a fingerprint of an incoming data block that is to be stored into a storage system. A "storage system" can include a storage device or an array of storage devices. A storage system may also include storage controller(s) that manage access of the storage device(s). A "data block" can refer to any unit of data that can be separately identified in the storage system. In some cases, a data block can refer to a chunk, a collection of chunks, or any other unit of data. Data blocks may or may not correspond to blocks defined for storage of data on a storage medium of a storage device.

A "fingerprint" refers to a value derived by applying a function on the on the content of the data block (where the "content" can include the entirety or a portion of the content of the data block). An example of the function that can be applied includes a hash function that produces a hash value based on the incoming data block. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

Fingerprints represent data blocks stored in the storage system. Full fingerprints uniquely identify respective data blocks (the difference between full fingerprints and partial fingerprints is discussed further below). A fingerprint computed for an incoming data block can be compared to fingerprints stored in a fingerprint index. A match between the fingerprint of the incoming data block with a fingerprint in the fingerprint index indicates that the incoming data block may be a duplicate of a data block already stored in the storage system. If the incoming data block is a duplicate of an already stored data block, instead of storing the duplicative incoming data block, a reference count stored in the storage system can be incremented to indicate the number of instances of the data block that have been received.

As the storage system fills up with data blocks, the size of the fingerprint index on persistent storage increases. Keeping a large fingerprint index up to date can be costly in terms of resource usage.

To improve performance, the fingerprint index can be maintained at multiple storage levels, including the persistent storage level and a memory level. The persistent storage level can include persistent storage implemented using one or more persistent (e.g., nonvolatile) storage device(s), such as disk-based storage device(s) (e.g., hard disk drive(s) (HDDs)), solid state device(s) (SSDs) such as flash storage device(s), or the like, or a combination thereof. The memory level can include volatile storage, which may have a higher access speed and may be more expensive than persistent storage device(s). The volatile storage can be implemented using volatile storage device(s), such as dynamic random access memory (DRAM) device(s), static random access memory (SRAM) device(s), and so forth.

The full fingerprint index can be stored in the persistent storage, while fingerprint index delta updates for updating the fingerprint index can be temporarily stored in a buffer in faster volatile storage (which may be referred to as "memory" herein and has a faster access speed than the persistent storage). A "fingerprint index delta update" can refer to update information for the fingerprint index for an incoming data block that is to be stored in a storage system. For example, a fingerprint index delta update for an incoming data block can include a fingerprint (e.g., a hash value) computed for the data block, and a storage location indicator for the data block. A "storage location indicator" can refer to any information that provides an indication of a storage location of a data block in the persistent storage. Examples of storage location indicators are provided further below.

The fingerprint index 110 maps fingerprints for data blocks to storage location indicators of the data blocks. The storage location indicators can be used to determine a storage location of a data block stored by the persistent storage 112, using a process discussed further below.

The fingerprint index 110 can be in the form of a B-tree index including nodes arranged in a hierarchical manner. Leaf nodes of the B-tree index include entries that map fingerprints to storage location indicators. Intermediate nodes of the B-tree index are used to more efficiently find a matching entry of the B-tree index based on a fingerprint. In other examples, the fingerprint index 110 can have a different form.

In some examples, dual buffers can be used that can be alternately designated as an active buffer and a flush buffer. FIG. 1 shows an example of a storage system 102 that includes a memory 104 that includes an active buffer 106 and a flush buffer 108. Although just one active buffer 106 and one flush buffer 108 are shown in FIG. 1, in other examples, the storage system 102 can include multiple active buffers 106 and/or multiple flush buffers 108. In examples described herein, the memory 104 may be implemented by one or more volatile storage devices, for example.

The active buffer 106 is used to receive fingerprint index delta updates 115 corresponding to incoming data blocks 114, while fingerprint index delta updates in the flush buffer 108 are merged (at 109) with a fingerprint index 110 in a persistent storage 112 of the storage system 102. The incoming data blocks 114 are associated with write requests for writing data to the storage system 102, where the data is stored in the persistent storage 112. The write requests can be issued by requester device(s) (not shown) coupled to the storage system 102, such as over a network. As noted above, a fingerprint index delta update for an incoming data block 114 includes a fingerprint and a corresponding storage location indicator for the incoming data block.

Merging (at 109) fingerprint index delta updates in the flush buffer 108 with the fingerprint index 110 on the persistent storage 112 refers to a process of applying the fingerprint index delta updates that include additions, deletions, location changes, and/or any other form of changes to an older version of the fingerprint index 110 on the persistent storage 112 in order to create a new version of the fingerprint index 110 on the persistent storage 112 that contains the applied changes.

Once the merging of the fingerprint index delta updates of the flush buffer 108 with the fingerprint index 110 on the persistent storage 112 has completed, the designation of the active buffer and the flush buffer can be switched, such that the buffer that was previously designated the active buffer becomes the flush buffer, and the buffer that was previously designated the flush buffer becomes the active buffer for receiving further fingerprint index delta updates.

In some cases, if the storage system load is high and incoming data blocks 114 are being received at a high rate from requester device(s), the active buffer 106 can fill up before the flush buffer 108 completes merging with the fingerprint index 110. This situation results in an update backlog issue. If the active buffer 106 is completely filled, then the storage system 102 may cease to perform deduplication such that duplicative data blocks are stored in the persistent storage 112 of the storage system 102, which may reduce deduplication performance (e.g., the deduplication ratio achieved by the storage system 102).

In accordance with some implementations of the present disclosure, in response to a triggering condition, adaptive sampling of fingerprints added to the fingerprint index 110 is performed to dynamically adjust a proportion of incoming data blocks for which fingerprints are added to the fingerprint index 110.

Sampling of fingerprints can vary between full sampling and partial sampling. With full sampling, fingerprints for all incoming data blocks 114 that are not duplicative of data blocks already stored in the storage system 102 are added to the fingerprint index 110. An incoming data block for which a duplicative data block is not already stored by the storage system 102, as determined by a deduplication engine 118, is referred to as a "non-duplicative incoming data block" in the ensuing discussion.

With partial sampling, a specified percentage (e.g., 80%, 50%, 40%, etc.) (less than all) of fingerprints for non-duplicative incoming data blocks 114 are added to a fingerprint index 110. For example, if the partial sampling of fingerprints is set at 80%, then fingerprints for 80% of non-duplicative incoming data blocks 114 are added to the fingerprint index 110. The fingerprints for the remaining 20% of non-duplicative incoming data blocks 114 are not added to the fingerprint index 110. The selection of which of the fingerprints are to be added and which are not can be based on any technique for selecting a subset of a population of fingerprints. For example, non-duplicative incoming data blocks can be considered in sequence.

The adaptive nature of the sampling of fingerprints allows the proportion of fingerprints for non-duplicative incoming data blocks that are selected for adding to the fingerprint index 110 to change over time, based on a triggering condition (or multiple triggering conditions). Examples of triggering conditions that can cause the adaptive sampling to select different proportions of fingerprints to add to the fingerprint index 110 can include any or some combination of the following: an amount of the active buffer 106 that has been filled with fingerprint index delta updates exceeding a threshold, a fill rate of the active buffer 106 (a rate at which fingerprint index delta updates are added to the active buffer 106) exceeding a fill rate threshold, a rate of lookup of the fingerprint index 110 exceeding a lookup rate threshold, a size of the fingerprint index 110 exceeding a size threshold, and/or any other condition.

As further shown in FIG. 1, a block location index 116 is stored in the persistent storage 112. The block location index 116 may be in the form of a B-tree index, or can have a different form in other examples. In some examples, the fingerprint index 110 maps fingerprints to storage block numbers (SBNs). An SBN is an example of a storage location indicator referred to above. An SBN is useable to determine where a data block is physically stored in persistent storage 112. However, the SBN does not actually identify the physical location.

Note that although the block location index 116 and the fingerprint index 110 are shown as stored in the persistent storage 112, in some cases, portions of the block location index 116 and the fingerprint index 110 may be retrieved into the memory 104 for faster lookup.

The block location index 116 maps SBNs to corresponding physical locations, such as physical addresses of the persistent storage 112. Thus, given a fingerprint of an incoming data block, if a lookup of the fingerprint index 110 using the given fingerprint produces a match to an entry of the fingerprint index 110, then that match may produces an SBN corresponding to the given fingerprint. The SBN is then used to lookup the block location index 116, which maps the SBN to a corresponding identifier of a physical location (e.g., a physical address) of a data block.

In some examples, the fingerprints stored by the fingerprint index 110 are partial fingerprints, which includes a portion (i.e., less than an entirety) of a full fingerprint computed by applying a fingerprint function on the content of a data block. For example, a partial fingerprint can include a partial hash value that includes a portion of a full hash value (such as a subset of the bits that make up the full hash value).

In addition to mapping SBNs to corresponding physical locations, the block location index 116 also maps SBNs to corresponding full fingerprints (e.g., full hash values). In some examples, a lookup of the fingerprint index 110 is a lookup of a partial fingerprint computed based on an incoming data block. In such examples, a match of the partial fingerprint in the fingerprint index 110 is not conclusive regarding whether or not a duplicative data block is already stored by the storage system 102. Because a partial fingerprint is used by the fingerprint index 110, potentially multiple different data values can produce the same partial fingerprint, which would result in a collision at the fingerprint index 110.

In such examples, to ensure that the matching entry of the fingerprint index 110 (that matches a partial fingerprint of a given incoming data block) actually corresponds to a duplicate of the incoming data block, the SBN of the matching entry of the fingerprint index 110 is used to retrieve the corresponding entry of the block location index 116, which contains the full fingerprint.

The deduplication engine 118 is able to determine, based on the full fingerprint from the block location index 116, whether or not the storage system 102 actually contains a duplicate of the given incoming data block. More specifically, the deduplication engine 118 compares the full fingerprint computed for the given incoming data block to the full fingerprint retrieved from the block location index 116. In such examples, if the full fingerprints match, then the deduplication engine 118 can make a determination that a duplicate of the given incoming data block is already stored by the storage system 102.

As shown in FIG. 1, the deduplication engine 118 includes a hasher 120 and an adaptive sampling logic 122. As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The hasher 120 and the adaptive sampling logic 122 can be implemented using a portion of the hardware processing circuit of the deduplication engine 118, or alternatively, can include machine-readable instructions executable by a hardware processing circuit of the deduplication engine 118. Although the hasher 120 and the adaptive sampling logic 122 are shown as being part of the deduplication engine 118, it is noted that in other examples, the hasher 120 and/or the adaptive sampling logic 122 can be separate from the deduplication engine 118.

A fingerprint produced by the hasher 120 is a hash value. In other examples, a different type of fingerprint generator can be used to generate another type of a fingerprint.

The adaptive sampling logic 122 adjusts the proportion of incoming data blocks 114 for which fingerprints are added to the fingerprint index 120, in response to any of the triggering conditions noted above.

The adjusted sampling effectively controls a proportion of fingerprint index delta updates 115 for non-duplicative incoming data blocks 114 that are input into the active buffer 106. In some examples, while the fingerprint index 110 is being updated by merging (at 109) fingerprint index delta updates of the flush buffer 108 into the fingerprint index 110, the adaptive sampling controlled by the adaptive sampling logic 122 can reduce a proportion of fingerprint index delta updates that are selected for input into the active buffer 106.

Although adaptive sampling can cause a subset of fingerprints for non-duplicative incoming data blocks 114 to not be added to the fingerprint index 110, a flocking characteristic of storage of data blocks in the storage system 102 can be leveraged to allow for enhanced deduplication even though some fingerprints are not placed in the fingerprint index 110 due to adaptive sampling. Flocking is based on temporal locality of data. A group of data blocks (such as those of a file or other data object) when first written to the persistent storage 112, when subjected to a deduplication process, may yield negative results indicating that no duplicates are present in the storage system 102. As a result, the first write of the group of data blocks will cause new fingerprint index delta updates to be created that are eventually merged into the fingerprint index 110 on the persistent storage 112. This group of data blocks is grouped temporally in time, e.g., the data blocks of the group are received in a temporal order, and stored in the temporal order in the persistent storage 112. It is likely that the same group of data blocks (e.g., the same file) may be written again at a later time, such that the information added to the fingerprint index 110 and block location index 116 due to the first write of the group of data blocks can be leveraged to perform deduplication of the subsequent writing of the group of data blocks.

The block location index 116, which correlates SBNs from the fingerprint index 110 to full fingerprints as well as to physical locations of respective data blocks, stores entries for incoming data blocks in the temporal order according to which the incoming data blocks were received and/or stored by the storage system 102. In other words, entries are added to the block location index 116 in the temporal order of data blocks being received and/or stored in the storage system 102. Entries for incoming data blocks that are temporally close to each other are also stored close together in the block location index 116. In some examples, SBNs are monotonically increasing (e.g., the SBN is incremented for each successive data block for which an entry is added to the block location index 116), such that SBNs for a group of non-duplicative incoming data blocks received sequentially (in time) will have monotonically increasing SBNs. In this way, data blocks associated with SBNs that are close to each other are likely to belong to a group of related data blocks (such as those of a file or other object) that may be accessed near in time to one another when accessed.

When adaptive sampling is performed such that some fingerprints (e.g., partial fingerprints) may not be added to the fingerprint index 110, the temporal locality of the fingerprints (e.g., full fingerprints) stored in the block location index 116 due to flocking can be used to perform deduplication for incoming data blocks for which the fingerprints were not added to the fingerprint index 110.

For example, in response to a fingerprint of a given incoming data block matching an entry present in the fingerprint index 110, the deduplication engine 118 uses the SBN of the matching fingerprint index entry to identify a corresponding given block entry in the block location index 116. In response, the deduplication engine 118 can retrieve a collection of block entries from the block location index 116. The retrieved collection of block entries can include block entries that are within a specified proximity of in the block location index 116, such as block entries with SBNs within a specified value of the SBN for the given block entry for the incoming data block, etc. The collection of block entries can include full fingerprints of corresponding data blocks that have temporal locality, and may include block entries (with full fingerprints) for data blocks that are not represented in the fingerprint index 110 (e.g., due to adaptive sampling). The deduplication engine 118 can deduplicate incoming data blocks using the retrieved collection of block entries from the block location index 116, which may allow engine 118 to perform deduplication even for incoming data blocks for which partial fingerprints were not added to the fingerprint index 110 due to adaptive sampling, as the retrieved collection of block entries may include block entries with full fingerprints that match fingerprints of data blocks not represented in the fingerprint index 110. The deduplication leverages the flocking or other temporal locality characteristic of the collection of block entries and the incoming data blocks.

Figure 2:
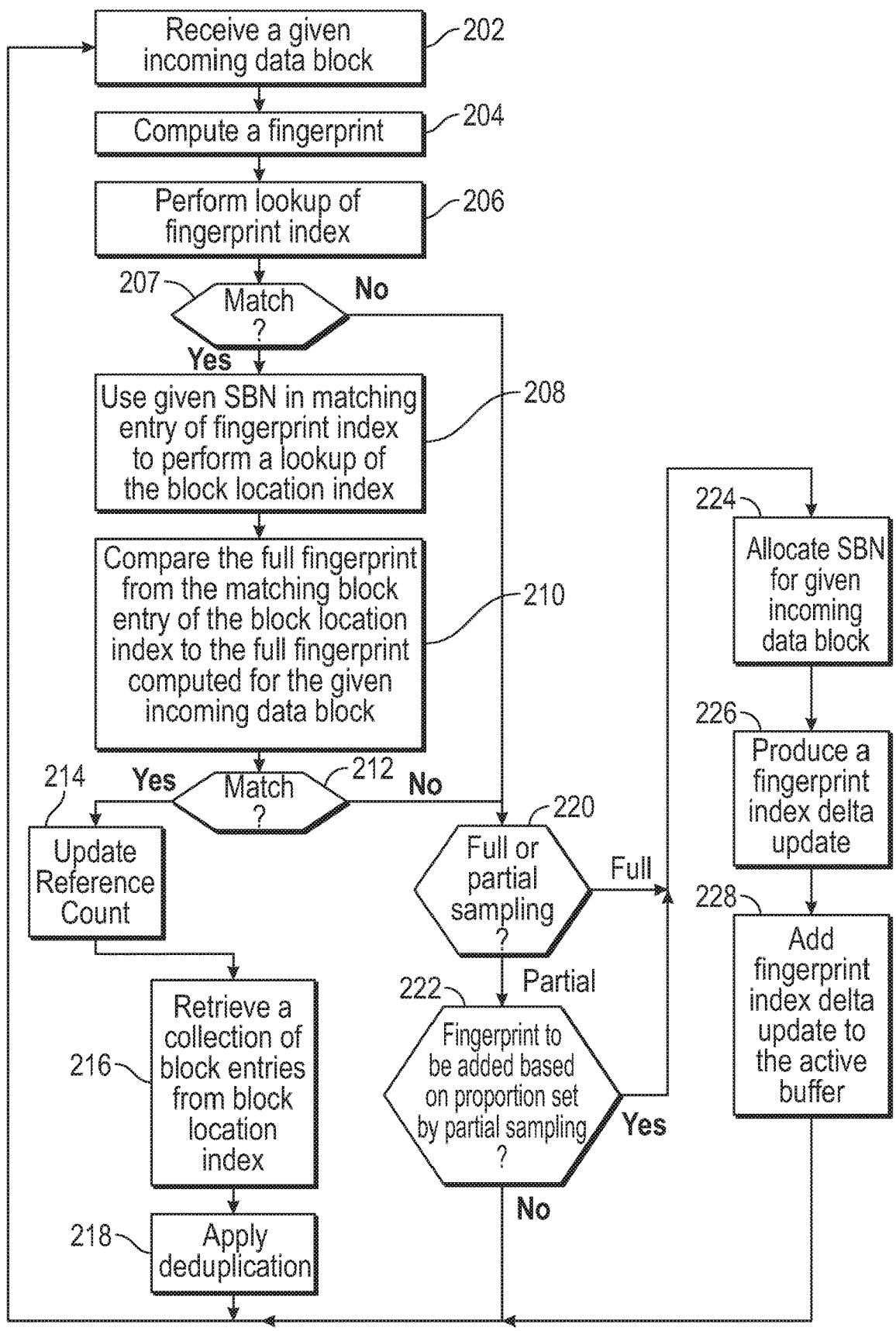
FIG. 2 is a flow diagram of a process according to some examples.

FIG. 2 shows an example of a deduplication process that can be performed by the deduplication engine 118 according to some examples. Although FIG. 2 shows an order of tasks, it is noted that the tasks can be performed in a different order, and/or additional or alternative tasks can be included in the process.

A given incoming data block 114 is received (at 202) by the deduplication engine 118. The given incoming data block 114 can include a logical address and write data to be stored in the persistent storage 112 at a physical location corresponding to the logical address in the given incoming data block 114. In some examples, the storage system 102 can include a logical address index 130 that maps logical addresses to SBNs (or other types of storage location indicators). The logical address index 130 can be stored in the persistent storage 112. In some examples, a portion of the logical address index 130 can be retrieved into the memory 104 for faster lookup.

The hasher 120 computes (at 204) a fingerprint (e.g., a hash value) based on the write data in the given incoming data block 114. A partial portion of the full fingerprint forms a partial fingerprint, which the deduplication engine 118 uses to perform (at 206) a lookup of the fingerprint index 110. The deduplication engine 118 determines (at 207) if the partial fingerprint matches an entry in the fingerprint index 110. If the partial fingerprint does not match an entry in the fingerprint index 110, the process proceeds to task 220 (discussed further below). If the partial fingerprint matches an entry of the fingerprint index 110, the match of the partial fingerprint for the given incoming data block 114 in the fingerprint index 110 is not conclusive with respect to whether or not a duplicate copy of the given incoming data block 114 is actually stored in the persistent storage 112.

The entry of the fingerprint index 110 that matches the partial fingerprint includes a given SBN that is mapped to the partial fingerprint. The deduplication engine 118 then uses (at 208) the given SBN to perform a lookup of the block location index 116. An entry of the block location index 116 that matches the given SBN maps the given SBN to (1) a physical location in the persistent storage 112 (such as in the form of a physical address) of a data block, and (2) a full fingerprint.

The deduplication engine 118 compares (at 210) the full fingerprint from the matching block entry of the block location index 116 to the full fingerprint computed by the hasher 120 for the given incoming data block 114. If a match occurs (as determined at 212), then that is an indication that the persistent storage 112 already stores a duplicate of the given incoming data block 114, and the deduplication engine 118 can avoid storing the given incoming data block 114 in the persistent storage 112. At this point, the deduplication engine 118 can update (at 214) a reference count in the persistent storage 112 to indicate that another duplicate copy of the given incoming data block has been stored in the persistent storage 112.

The deduplication engine 118 retrieves (at 216) a collection of (temporally local) block entries from the block location index 116 to apply flock-based deduplication (at 218) by comparing full fingerprints of the block entries from the collection to full fingerprints computed based on received incoming data blocks 114. This allows deduplication based on the flocking characteristic of data stored in the persistent storage 112, even though partial sampling as set by the adaptive sampling logic 122 may cause a portion of fingerprints of duplicative incoming data blocks 114 to not be stored in the fingerprint index 110.

If the full fingerprint of the matching entry of the block location index 116 that maps to the given SBN does not match (as determined at 212) the full fingerprint computed for the given incoming data block 114, then that is an indication that a duplicate copy of the incoming data block 114 has not been stored in the persistent storage 112. If the full fingerprint of the matching entry of the block location index 116 does not match the full fingerprint computed for the incoming data block 114 (or if the partial fingerprint did not match an entry in the fingerprint index 110 as determined at 207), the deduplication engine 118 can determine (at 220) whether adaptive sampling as set by the adaptive sampling logic 122 is a full sampling or a partial sampling. If full sampling, then a fingerprint index delta update for the given incoming data block 114 is added to the active buffer 106. If partial sampling, then the deduplication engine 118 determines (at 222) whether the fingerprint for the given (non-duplicative) incoming data block 114 is to be added to the fingerprint index 110 based on the proportion of fingerprints to be added to the fingerprint index 110 corresponding to the partial sampling. For example, if the partial sampling is a 50% sampling, then just half of the fingerprints of non-duplicative incoming data blocks 114 are added to the fingerprint index 110, such as by selecting every other fingerprint or some other selection technique.

In a more specific example, it is assumed that a byte of a full fingerprint of a non-duplicative incoming data block is used for sampling and is called the "sampling byte." In other examples, a different portion of the full fingerprint makes up the sampling byte. Partial sampling can select a fingerprint to include (or not) in the fingerprint index 110 based on the value of the sampling byte. If the sampling byte is a byte of the full fingerprint, then the possible value range of the sampling byte is 0-255. If 50% sampling is set, then the deduplication engine 118 can add a partial fingerprint with a sampling byte value in the range of 0-127 in the fingerprint index 110, and exclude a partial fingerprint with a sampling byte value in the range of 128-255 from the fingerprint index 110.

In other examples, other selection techniques to select whether or not partial fingerprints are to be added to the fingerprint index 110 can be used.

If the deduplication engine 118 determines (at 222) that the fingerprint for the given incoming data block 114 is not to be added to the fingerprint index 110, then the deduplication engine 118 returns to task 202 to receive the next incoming data block.

However, if the deduplication engine 118 determines (at 222) that the fingerprint for the given incoming data block 114 is to be added to the fingerprint index 110, then the deduplication engine 118 proceeds to perform tasks 224-228 to add a fingerprint index delta update for the given incoming data block 114 to the active buffer 106. The deduplication engine 118 also performs tasks 224-228 in response to full sampling being currently set by the adaptive sampling logic 122.

The deduplication engine 118 allocates (at 224) the SBN for the given incoming data block 114.

The deduplication engine 118 produces (at 226) a fingerprint index delta update that contains the partial fingerprint for the given incoming data block 114 and the corresponding SBN. The deduplication engine 118 then adds (at 228) the fingerprint index delta update to the active buffer 106 in the memory 104.

At the time of merging the fingerprint index delta update into the fingerprint index 110, if the partial fingerprint of fingerprint index delta update matches a partial fingerprint already stored in the fingerprint index 110, then a collision may have occurred. In this case, the entry of the fingerprint index 110 containing the matching partial fingerprint is replaced with the information in the fingerprint index delta update. The replaced entry can include a new SBN (of the fingerprint index delta update) that replaces a previous SBN mapped to the fingerprint index.

Figure 3:
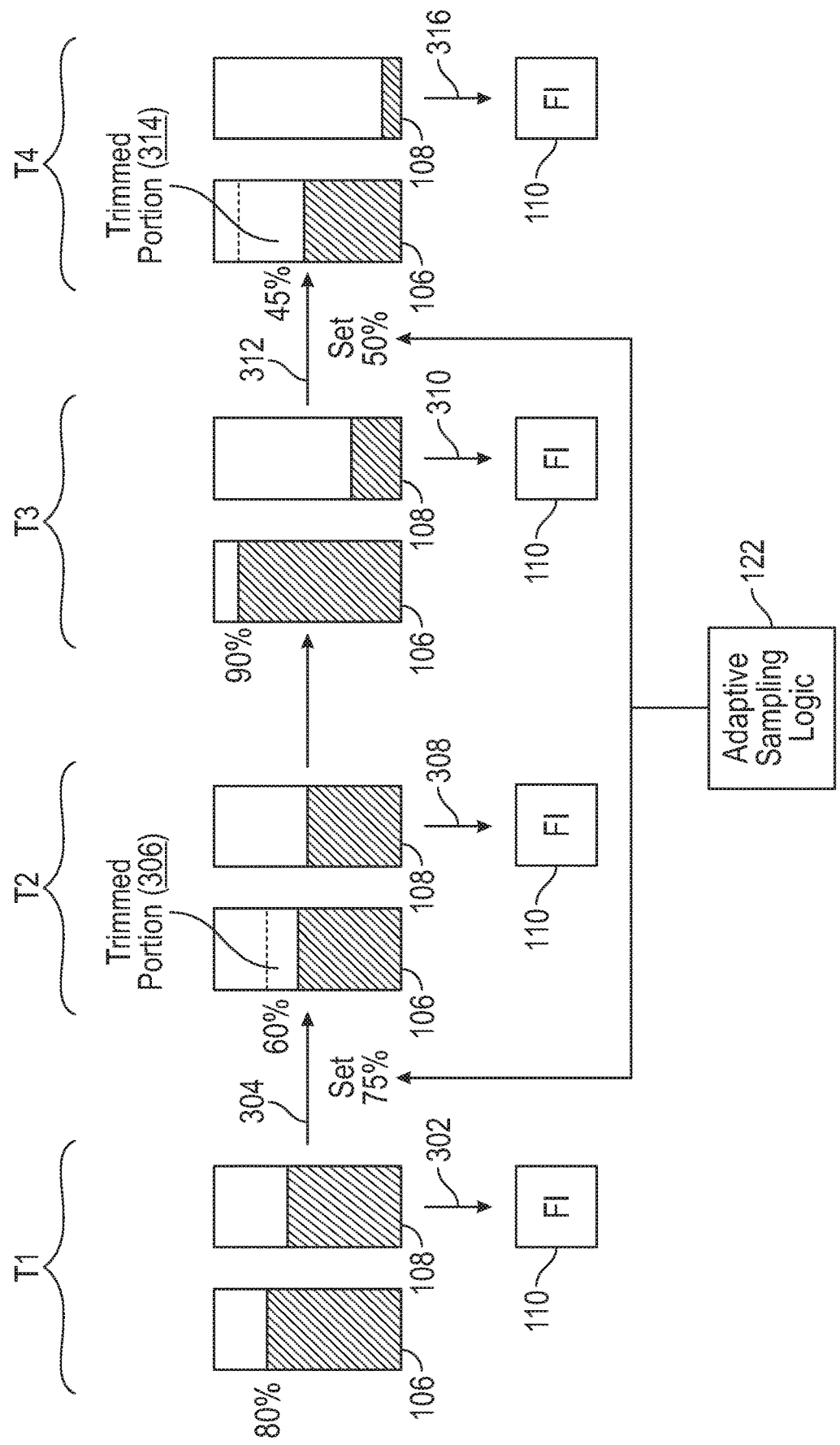
FIG. 3 illustrates example contents of active and flush buffers in response to different sampling proportions set by the adaptive sampling logic, according to some examples.

FIG. 3 illustrates an example of the content of the active buffer 106 and the flush buffer 108 at different time instants.

Initially, at a first time instant T1, it is assumed that full sampling is set by the adaptive sampling logic 122, such that all fingerprints computed based on non-duplicative incoming data blocks 114 are added to the fingerprint index 110. This results in fingerprint index delta updates for all non-duplicative incoming data blocks 114 that do not have duplicate instances in the persistent storage 112 to be added to the active buffer 106. At time instant T1, it is assumed that the active buffer 106 is 80% full, and the fingerprint index delta updates in the flush buffer 108 are in the process of merging (at 302) with the fingerprint index 110.

In response to a trigger condition being satisfied, the adaptive sampling logic 122 reduces the proportion of fingerprints of non-duplicative incoming data blocks 114 that is added to the fingerprint index 110. For example, the adaptive sampling logic 122 can reduce the sampling to 75% (at 304). Setting the sampling to 75% reduces the proportion at which fingerprint index delta updates for non-duplicative incoming data blocks 114 are added to the active buffer 106 (i.e., 75% of the fingerprint index delta updates for non-duplicative incoming data blocks 114 are added to the active buffer 106, while 25% of the fingerprint index delta updates for non-duplicative incoming data blocks 114 are not added to the active buffer 106).

In accordance with some implementations of the present disclosure, in addition to reducing sampling, the adaptive sampling logic 122 can also trim the content of the active buffer 106. For example, at time instant T2 in FIG. 3, a portion 306 of the active buffer 106 is trimmed, to reduce the amount of the active buffer 106 filled with fingerprint index delta updates. Trimming the active buffer 106 refers to removing a certain number (1 or greater than 1) of fingerprint index delta updates from the active buffer 106. For example, if the adaptive sampling is set at 75%, then 25% (100%−75%) of the fingerprint index delta updates in the active buffer 106 are removed.

At time instant T2, due to the trimming of 25% of the fingerprint index delta updates from the active buffer 106, the active buffer 106 is 60% full. Also, at time instant T2, the fingerprint index delta updates in the flush buffer 108 continue to be merged (at 308) with the fingerprint index 110.

At time instant T3, it is detected that the active buffer 106 continues to fill, such as to 90% full, despite the reduced sampling (to 75%) set by the adaptive sampling logic 122. The flush buffer 108 is still partially full while continuing to merge (at 310) with the fingerprint index 110. Thus, there may be a risk that the active buffer 106 may fill up before the fingerprint index delta updates of the flush buffer 110 have completed merging with the fingerprint index 110. In response, the adaptive sampling logic 122 again reduces the sampling of the fingerprints added to the fingerprint index 110, in this case by reducing the sampling proportion to 50% (at 312). In addition, the adaptive sampling logic 122 can trim a further portion 314 of the active buffer 106, by removing the portion 314 from the active buffer 106. The trimmed portion 314 is 50% of the number of fingerprint index delta updates at time instant T2 (90%), so that after trimming, the active buffer at time instant T4 is 45% (50% of 90%).

By further reducing the sampling proportion to 50% and trimming a corresponding amount from the active buffer 106, the fingerprint index delta updates in the flush buffer 108 may be able to complete merging (at 316) with the fingerprint index 110 before the active buffer 106 fills up completely.

Once the flush buffer 108 is empty, the designation of the active buffer and the flush buffer can be switched, such that the active buffer 106 becomes the flush buffer, and the flush buffer 108 becomes the active buffer.

In some examples, once the fingerprint index delta updates of the flush buffer 108 have all been merged with the fingerprint index 110, the adaptive sampling logic 122 can also reset the sampling proportion to full sampling. More generally, the sampling proportion can be increased from a lower proportion to a higher proportion in response to a specified reduction (based on a specified criterion) in an amount of fingerprint index delta updates in the flush buffer 108 that are to be applied to the fingerprint index 110.

Figure 4:
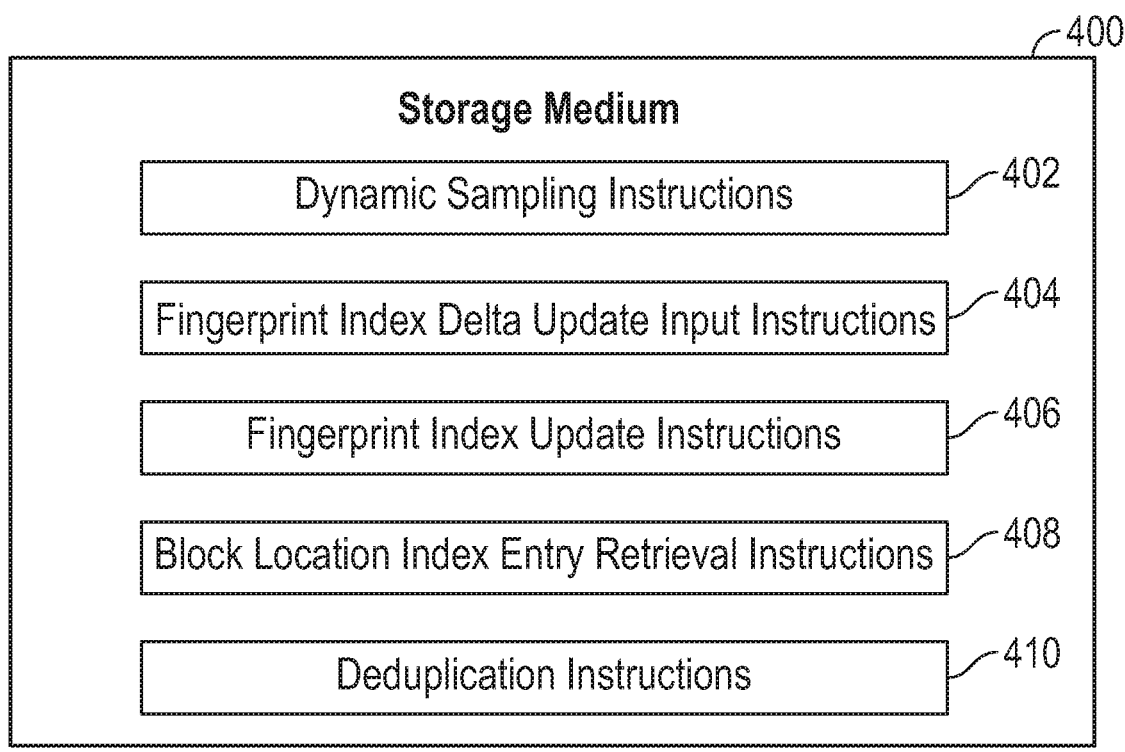
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system (e.g., the storage system 102 of FIG. 1) to perform various tasks.

The machine-readable instructions include dynamic sampling instructions 402 to dynamically adjust a proportion of incoming data blocks for which respective fingerprints are added to a fingerprint index (e.g., 110 in FIG. 1), where the fingerprint index correlates fingerprints for data blocks to storage location indicators for the data blocks. The dynamic adjustment of the proportion includes reducing the proportion while an update of the fingerprint index is performed. In some examples, the fingerprints in the fingerprint index can be partial fingerprints.

In some examples, dynamically adjusting the proportion of incoming data blocks for which fingerprints are added to the fingerprint index is based on any or some combination of the following: an amount of the buffer that is filled exceeding a threshold, a fill rate of the buffer (e.g., a rate at which the buffer is being filled) exceeding a threshold, a rate of lookup (e.g., rate of accesses such as reads and/or writes) of the fingerprint index exceeding a threshold, or a size of the fingerprint index exceeding a threshold.

The machine-readable instructions include fingerprint index delta update input instructions 404 to input, into a buffer (e.g., 106 in FIG. 1), fingerprint index delta updates for the incoming data blocks according to the dynamically adjusted proportion.

The machine-readable instructions include fingerprint index update instructions 406 to update the fingerprint index based on the fingerprint index delta updates input into the buffer. The fingerprint index is to be updated based on the fingerprint index delta updates in the buffer.

The machine-readable instructions include block location index entry retrieval instructions 408 to retrieve, in response to a fingerprint of an incoming data block, a collection of block entries from a block location index (e.g., 116 in FIG. 1) that stores information for data blocks stored in temporal order; and The machine-readable instructions further include deduplication instructions 410 to deduplicate the incoming data blocks using the collection of block entries from the block location index. In some examples, the block entries can be full fingerprints of data blocks.

In further examples, the machine-readable instructions can include trimming instructions to perform trimming by removing a number (1 or greater than 1) of fingerprint index delta updates from the buffer in response to reducing the proportion, where deduplication based on the fingerprint index is not applied for the removed number of fingerprint index delta updates.

Figure 5:
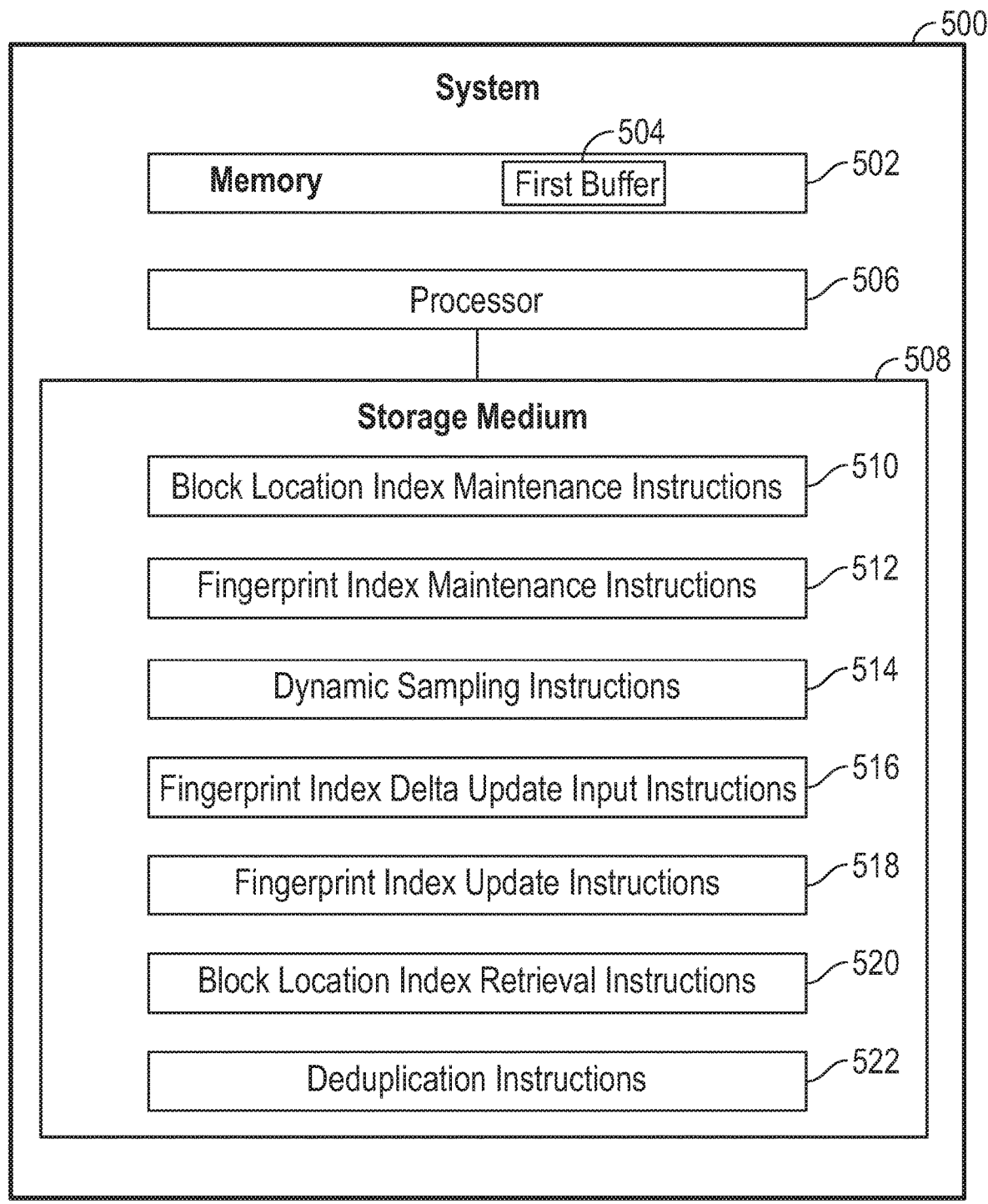
FIG. 5 is a block diagram of a system according to some examples.

FIG. 5 is a block diagram of a system 500 according to some examples. The system 500 can include the storage system 102 of FIG. 1, or another system implemented using a computer or multiple computers.

The system 500 includes a memory 502 to store a first buffer 504 (e.g., the active buffer 106 of FIG. 1). The system 500 further includes a hardware processor 506 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 500 includes a storage medium 508 storing machine-readable instructions executable on the hardware processor 506 to perform various tasks. Machine-readable instructions executable on a hardware processor can refer to the instructions executable on a single hardware processor or the instructions executable on multiple hardware processors.

The machine-readable instructions include block location index maintenance instructions 510 to maintain a block location index (e.g., 116 in FIG. 1) that correlates storage location indicators (e.g., SBNs) to respective full fingerprints of corresponding data blocks stored in a storage system. The machine-readable instructions include fingerprint index maintenance instructions 512 to maintain a fingerprint index (e.g., 110 in FIG. 1) that correlates partial fingerprints to respective storage location indicators.

The machine-readable instructions include dynamic sampling instructions 514 to dynamically adjust a proportion of incoming data blocks for which partial fingerprints are added to the fingerprint index.

The machine-readable instructions include fingerprint index delta update input instructions 516 to input fingerprint index delta updates for the incoming data blocks into the first buffer according to the dynamically adjusted proportion.

The machine-readable instructions include fingerprint index update instructions 518 to update the fingerprint index based on the fingerprint index delta updates input into the first buffer.

The machine-readable instructions include block location index fingerprint retrieval instructions 520 to retrieve, in response to a fingerprint of an incoming data block, a collection of full fingerprints from the block location index.

The machine-readable instructions include deduplication instructions 522 to deduplicate the incoming data blocks using the collection full fingerprints from the block location index.

Figure 6:
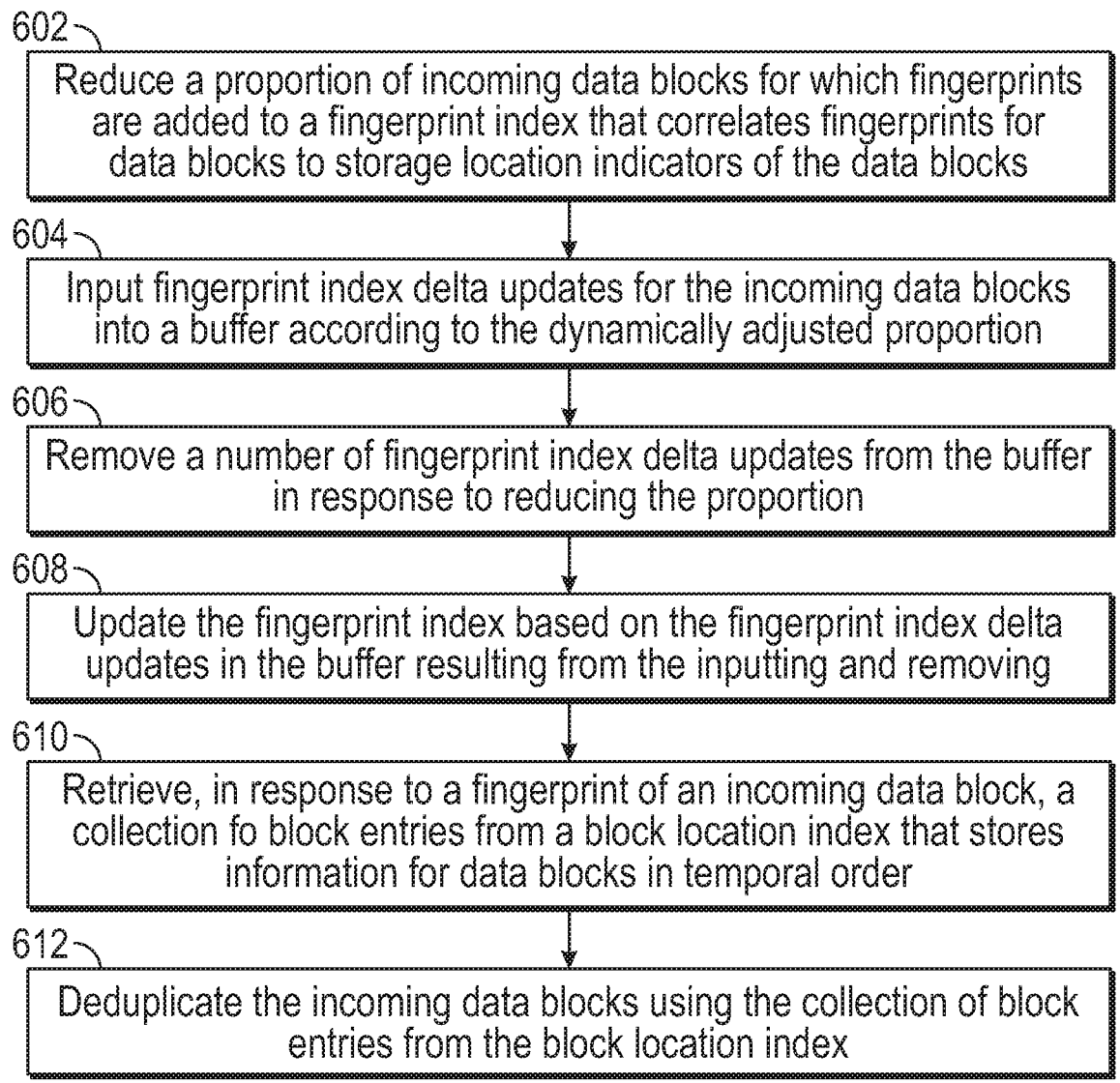
FIG. 6 is a flow diagram of a process according to further examples.

FIG. 6 is a block diagram of a process 600 according to further examples. The process can be performed by the storage system 102 or a different system.

In response to detecting a trigger condition, the process 600 reduces (at 602) a proportion of incoming data blocks for which fingerprints are added to a fingerprint index that correlates fingerprints for data blocks to storage location indicators of the data blocks. The process 600 inputs (at 604) fingerprint index delta updates for the incoming data blocks into a buffer according to the dynamically adjusted proportion.

The process 600 removes (at 606) a number of fingerprint index delta updates from the buffer in response to reducing the proportion.

The process 600 updates (at 608) the fingerprint index based on the fingerprint index delta updates in the buffer resulting from the inputting and the removing.

The process 600 retrieves (at 610), in response to a fingerprint of an incoming data block, a collection of block entries from a block location index that stores information for data blocks received in temporal order.

The process 600 deduplicates (at 612) the incoming data blocks using the collection of block entries from the block location index.

A storage medium (e.g., 400 in FIG. 4 or 508 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

dynamically adjust a proportion of incoming data blocks for which respective fingerprints are added to a fingerprint index, wherein the fingerprint index correlates fingerprints for data blocks to storage location indicators for the data blocks;

input, into a first buffer, fingerprint index delta updates for the incoming data blocks according to the dynamically adjusted proportion;

update the fingerprint index based on fingerprint index delta updates in a second buffer while the fingerprint index delta updates for the incoming data blocks are input into the first buffer;

retrieve, in response to a fingerprint of an incoming data block, a collection of block entries from a block location index that stores information for data blocks in temporal order; and deduplicate the incoming data blocks using the collection of block entries from the block location index;

wherein the dynamically adjusting the proportion of incoming data blocks for which fingerprints are added to the fingerprint index causes a reduction in a proportion at which fingerprint index delta updates are input into the first buffer while the fingerprint index is updated using the fingerprint index delta updates in the second buffer.

2. The non-transitory machine-readable storage medium of claim 1, wherein dynamically adjusting the proportion comprises reducing the proportion while the update of the fingerprint index, based on the fingerprint index delta updates in the second buffer, is performed.

3. The non-transitory machine-readable storage medium of claim 2, wherein the instructions upon execution cause the system to:
remove, from the first buffer, a number of the fingerprint index delta updates in the first buffer in response to reducing the proportion, wherein deduplication based on the fingerprint index is not applied for the removed number of the fingerprint index delta updates.

4. The non-transitory machine-readable storage medium of claim 2, wherein the first buffer is an active buffer and the second buffer is a flush buffer and the fingerprint index delta updates in the flush buffer are to be merged with the fingerprint index, and wherein the instructions upon execution cause the system to:
increase the proportion in response to a specified reduction in an amount of fingerprint index delta updates present in the flush buffer.

5. The non-transitory machine-readable storage medium of claim 1, wherein the fingerprints in the fingerprint index are partial fingerprints of data blocks.

6. The non-transitory machine-readable storage medium of claim 5, wherein the block entries comprise full fingerprints of data blocks for which the block location index stores information.

7. The non-transitory machine-readable storage medium of claim 1, wherein dynamically adjusting the proportion of incoming data blocks for which fingerprints are added to the fingerprint index is based on an amount of the first buffer that is filled.

8. The non-transitory machine-readable storage medium of claim 1, wherein dynamically adjusting the proportion of incoming data blocks for which fingerprints are added to the fingerprint index is based on a fill rate of the first buffer.

9. The non-transitory machine-readable storage medium of claim 1, wherein dynamically adjusting the proportion of incoming data blocks for which fingerprints are added to the fingerprint index is based on a rate of lookup of the fingerprint index.

10. The non-transitory machine-readable storage medium of claim 1, wherein dynamically adjusting the proportion of incoming data blocks for which fingerprints are added to the fingerprint index is based on a size of the fingerprint index.

11. The non-transitory machine-readable storage medium of claim 1, wherein the instructions upon execution cause the system to:
after completing the update of the fingerprint index using the fingerprint index delta updates in the second buffer:
input additional fingerprint index delta updates for additional incoming data blocks into the second buffer, while updating the fingerprint index with the fingerprint index delta updates in the first buffer.

12. The non-transitory machine-readable storage medium of claim 1, wherein the adjusted portion is less than 100%.

13. A system comprising:
a memory to store a first buffer and a second buffer;
a processor; and
a storage medium storing instructions executable on the processor to:
maintain a block location index that correlates storage location indicators to respective full fingerprints of corresponding data blocks stored in a storage system;
maintain a fingerprint index that correlates partial fingerprints to respective storage location indicators;
dynamically adjust a proportion of incoming data blocks for which partial fingerprints are added to the fingerprint index;
input fingerprint index delta updates for the incoming data blocks into the first buffer according to the dynamically adjusted proportion;
update the fingerprint index based on fingerprint index delta updates input into the second buffer while the fingerprint index delta updates for the incoming data blocks are input into the first buffer;
retrieve, in response to a fingerprint of an incoming data block, a collection of full fingerprints from the block location index; and
deduplicate the incoming data blocks using the collection full fingerprints from the block location index;
wherein the dynamically adjusting the proportion of incoming data blocks for which fingerprints are added to the fingerprint index causes a reduction in a proportion at which fingerprint index delta updates are input into the first buffer while the fingerprint index is updated using the fingerprint index delta updates in the second buffer.

14. The system of claim 13, wherein the block location index stores information for data blocks in temporal order.

15. The system of claim 13, wherein the instructions are executable on the processor to:
remove, from the first buffer, a number of the fingerprint index delta updates in the first buffer in response to reducing the proportion, wherein deduplication based on the fingerprint index is not applied for the removed number of the fingerprint index delta updates.

16. A method performed by a system comprising a hardware processor, comprising:
in response to detecting a trigger condition; reducing a proportion of incoming data blocks for which fingerprints are added to a fingerprint index that correlates fingerprints for data blocks to storage location indicators of the data blocks;
inputting fingerprint index delta updates for the incoming data blocks into a first buffer according to the dynamically adjusted proportion;
removing from the first buffer, a number of fingerprint index delta updates in the first buffer in response to reducing the proportion;
updating the fingerprint index based on the fingerprint index delta updates in the second buffer while the fingerprint index delta updates for the incoming data blocks are input into the first buffer;
retrieving, in response to a fingerprint of an incoming data block, a collection of block entries from a block location index that stores information for data blocks received in temporal order; and
deduplicating the incoming data blocks using the collection of block entries from the block location index;
wherein the dynamically adjusting the proportion of incoming data blocks for which fingerprints are added to the fingerprint index causes a reduction in a proportion at which fingerprint index delta updates are input into the first buffer while the fingerprint index is updated using the fingerprint index delta updates in the second buffer.

17. The method of claim 16; further comprising:
increasing the proportion in response to a specified reduction in an amount of fingerprint index delta updates in the second buffer that are to be applied to the fingerprint index.

18. The method of claim 16, wherein dynamically adjusting the proportion of incoming data blocks for which fingerprints are added to the fingerprint index is based on an amount of the first buffer that is filled.

19. The method of claim 16, wherein dynamically adjusting the proportion of incoming data blocks for which fingerprints are added to the fingerprint index is based on a fill rate of the first buffer.

20. The method of claim 16, wherein dynamically adjusting the proportion of incoming data blocks for which fingerprints are added to the fingerprint index is based on a rate of lookup of the fingerprint index.

* * * * *